United States Patent
Stevens et al.

(10) Patent No.: US 6,519,331 B1
(45) Date of Patent: Feb. 11, 2003

(54) TELECOMMUNICATIONS SYSTEM, SERVICE CONTROL POINT AND METHOD FOR PRE-SCREENING TELEPHONE CALLS TO HELP PREVENT TELEPHONE TOLL FRAUD

(75) Inventors: Gilman R. Stevens, Fairview, TX (US); Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 180 days.

(21) Appl. No.: 09/653,938

(22) Filed: Sep. 1, 2000

(51) Int. Cl.[7] ...................... H04M 15/00; H04M 17/00; H04M 3/00
(52) U.S. Cl. ............. 379/145; 379/144.01; 379/114.01; 379/114.14; 379/188; 379/189
(58) Field of Search ................ 379/112.01, 114.01, 379/114.03, 114.05, 114.14, 114.15, 114.17, 114.19, 114.2, 133, 144.01, 144.03, 145, 188, 189, 127.02

(56) References Cited

U.S. PATENT DOCUMENTS

| 5,146,491 A | * | 9/1992 | Silver et al. ........... 379/114.01 |
| 5,504,810 A | * | 4/1996 | McNair ...................... 379/189 |
| 5,566,234 A | * | 10/1996 | Reed et al. .................. 379/188 |
| 5,574,781 A | * | 11/1996 | Blaze ..................... 379/220.01 |
| 5,638,430 A | * | 6/1997 | Hogan et al. .......... 379/112.01 |
| 5,768,354 A | * | 6/1998 | Lange et al. ................. 379/189 |
| 5,809,125 A | * | 9/1998 | Gammino ................... 379/189 |
| 5,907,602 A | * | 5/1999 | Peel et al. ............. 379/114.01 |
| 6,178,234 B1 | * | 1/2001 | Cai et al. ............... 379/114.01 |
| 6,208,720 B1 | * | 3/2001 | Curtis et al. ........... 379/114.01 |
| 6,327,245 B1 | * | 12/2001 | Jordan ..................... 379/88.02 |
| 6,335,971 B1 | * | 1/2002 | Springer et al. ............ 379/189 |

FOREIGN PATENT DOCUMENTS

| WO | WO 01/45380 | * | 6/2001 | .......... H04M/15/00 |

* cited by examiner

*Primary Examiner*—Curtis Kuntz
*Assistant Examiner*—Quoc Tran
(74) *Attorney, Agent, or Firm*—William J. Tucker; Richard A. Mysliwiec; V. Lawrence Sewell

(57) ABSTRACT

A telecommunications system, service control point and method are described that can pre-screen a telephone call to help prevent telephone toll fraud. More specifically, the telecommunications system includes a service control point capable of receiving information about a telephone call originated by a calling party, and further capable of determining whether the telephone call has a fraudulent attribute. If the telephone call has a fraudulent attribute, then the calling party is informed that there is a possibility of telephone toll fraud occurring if the telephone call is connected to a called party. And, if the telephone call does not have a fraudulent attribute, then the telephone call is automatically connected to the called party.

6 Claims, 4 Drawing Sheets

TELECOMMUNICATIONS SYSTEM, SERVICE CONTROL POINT AND METHOD FOR PRE-SCREENING TELEPHONE CALLS TO HELP PREVENT TELEPHONE TOLL FRAUD

BACKGROUND OF THE INVENTION

1. Field of the Invention

The present invention relates in general to the telecommunications field and, in particular, to a telecommunications system, service control point and method capable of pre-screening a telephone call to help prevent telephone toll fraud.

2. Description of Related Art

In the telecommunications field, telephone toll fraud is an ever-increasing problem that can be very expensive to telephone users and telephone companies. The typical telephone toll fraud scheme involves a scam artist tricking a telephone user (calling party) into calling what appears to be a domestic long distance call or an 800/888 free call, but instead the call is actually a toll call or an international call both of which can have a very high billing charge back rate. Therefore, the calling party currently takes a chance whenever they call an unfamiliar telephone number, because the call may look like a domestic long distance call or 800/888 free call but in actuality it is a costly toll call or a costly international call. And, only after the calling party receives their telephone bill do they find out that these unfamiliar telephone numbers were in fact expensive "pay-per-call" numbers (e.g., 900 numbers).

The international telephone toll fraud schemes often work because it is not always easy for the calling party to tell when they are calling an international number. For example, there are situations where the calling party can simply dial a three-digit area code and number to reach someone in a foreign country. This is not like the typical situation where the calling party must dial a "011" (international access code), a country code, a city code and a number to reach someone in a foreign country. Scam artists take advantage of this difference by promoting calls having an 809 area code (for example) which if dialed connect the calling party to someone in the Caribbean who charges the calling party a large fee. In fact, there are dozens of these three-digit area code calls that are really "international" calls. The scam artists often promote these 809 type calls in uniquely deceptive ways. For instance, the scam artist may leave an "urgent" message on an answering machine, pager or computer of the telephone user trying to get them to call an 809 number. The message often falsely claims that a family member of the telephone user has been injured, that they have won a prize, or that there is a problem with their credit. If the telephone user returns the call, they may be putting money in the pockets of the scam artist.

Similar to international calls are 900 type calls which also charge a calling party a fee for simply dialing the telephone number. However, providers of 900 calls are supposed to follow the Federal Trade Commission's 900-Number Rule that requires them to disclose the cost of the 900 call before those costs are charged to the calling party. In addition, the 900-Number Rule states that the providers of 800/888 free calls are prohibited from automatically connecting the calling party to a 900 call. Unfortunately, some providers do not follow the 900-Number Rule and automatically connect an 800/888 free call to a 900 number and charge the calling party for the 900 call.

To date, there does not appear to be any way of informing a calling party when one of their calls may be part of a telephone toll fraud scheme. Accordingly, there is a need for a telecommunications system, service control point and method capable of pre-screening a telephone call to help prevent telephone toll fraud. This need and other needs are satisfied by the telecommunications system, service control point and method of the present invention.

BRIEF DESCRIPTION OF THE INVENTION

The present invention includes a telecommunications system, service control point and method that are capable of pre-screening a telephone call to help prevent telephone toll fraud. More specifically, the telecommunications system includes a service control point capable of receiving information about a telephone call originated by a calling party, and further capable of determining whether the telephone call has a fraudulent attribute. If the telephone call has a fraudulent attribute, then the calling party is informed that there is a possibility of telephone toll fraud occurring if the telephone call is connected to a called party. And, if the telephone call does not have a fraudulent attribute, then the telephone call is automatically connected to the called party.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–4, there are disclosed a preferred embodiment of a telecommunications system 100, service control point (SCP) 110 and method 300 all of which are capable of pre-screening a telephone call to help prevent telephone toll fraud in accordance with the present invention.

Figure 1:
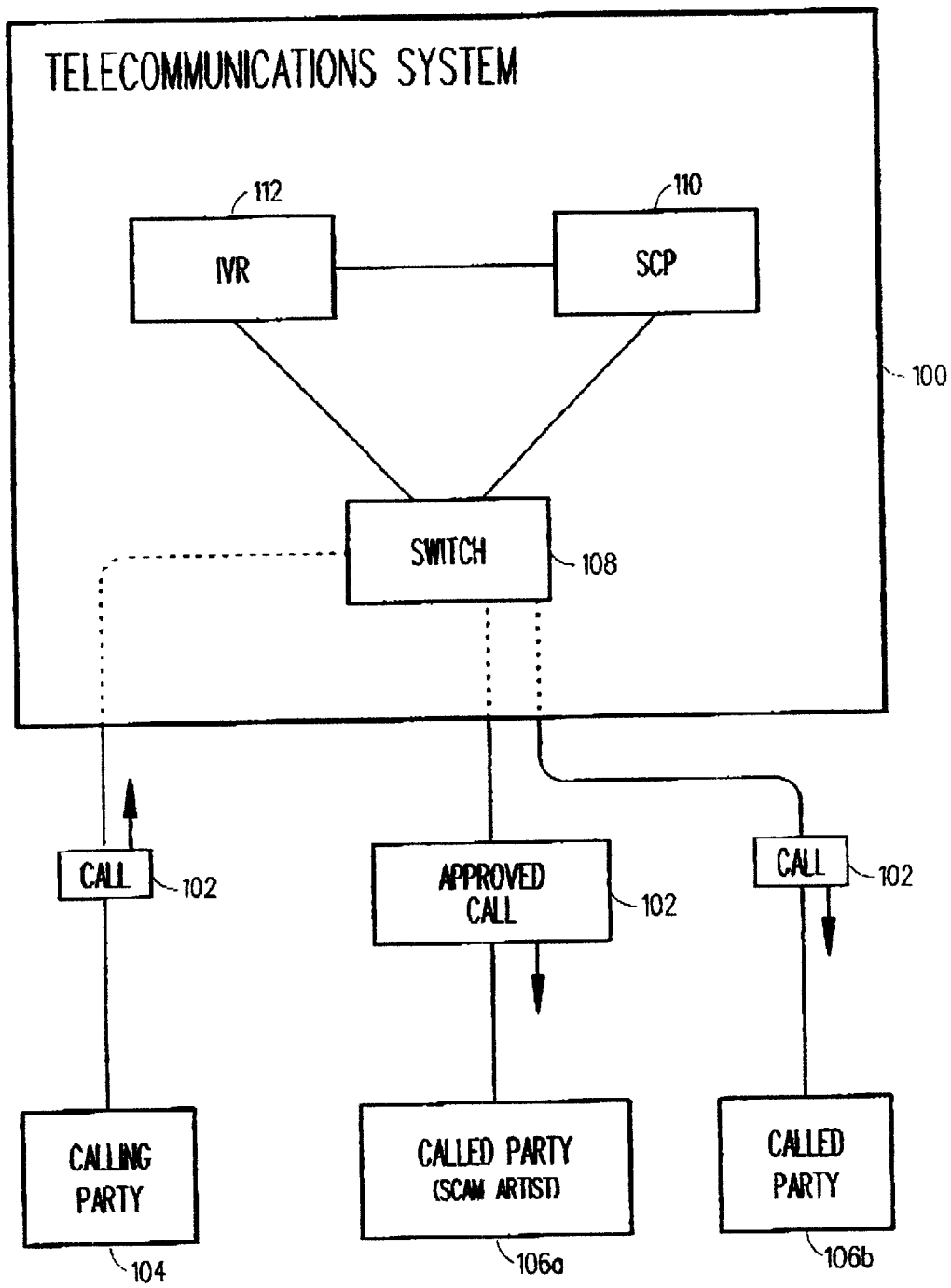
FIG. 1 is a block diagram illustrating the basic components of a telecommunications system in accordance with the present invention.

Referring to FIG. 1, there is a block diagram illustrating the basic components of the telecommunications system 100. Essentially, the telecommunications system 100 is capable of pre-screening a telephone call 102 to determine whether the telephone call 102 has a fraudulent attribute prior to connecting a calling party 104 to a called party 106a or 106b. The pre-screening of the telephone call 102 is designed to detect and prevent telephone toll fraud.

More specifically, the telecommunications system 100 includes a switch 108 (e.g., service switching point (SSP)) capable of receiving the telephone call 102 originated by the calling party 104. The switch 108 can forward information associated with the telephone call 102 to the SCP 110. The SCP 110 has routing algorithms that can determine whether or not the telephone call 102 has any fraudulent attributes prior to connecting the calling party 104 to the called party 106a or 106b. The telephone call 102 has a fraudulent attribute if a service provider can not assure the calling party 104 that the telephone call 102 is free to the calling party 104. And, the telephone call 102 has a fraudulent attribute if the service provider can not assure the calling party 104 that they are going to be billed at a previously agreed upon billing rate. For instance, the telephone call 102 can have a fraudulent attribute if the telephone call 102 is supposed to be an 800/888 free call but a particular destination of the called party 106a is a "pay-per-call" number. A variety of different fraudulent attributes are described in greater detail with respect to FIG. 2.

In the event the SCP 110 determines that the telephone call 102 has a fraudulent attribute, then an IVR voice response system (IVR) 112 (or Internet Protocol-Service Resource Point (IP-SRP)) informs the calling party 104 that there is a possibility of telephone toll fraud occurring if the telephone call 102 is connected to the called party 106a. The calling party 104 can then indicate if they want to be connected to the called party 106a that can be a possible scam artist. If the calling party 104 approves the connection to the called party 106a, then the service provider may not be responsible for any telephone charges that are billed to the calling party 104.

In the event the SCP 110 determines that the telephone call 102 does not have a fraudulent attribute, then the SCP 110 can inform the switch 108 as to the best route to connect the calling party 104 to the called party 106b. The switch 108 can then automatically connect the calling party 104 to the called party 106b.

Figure 2:
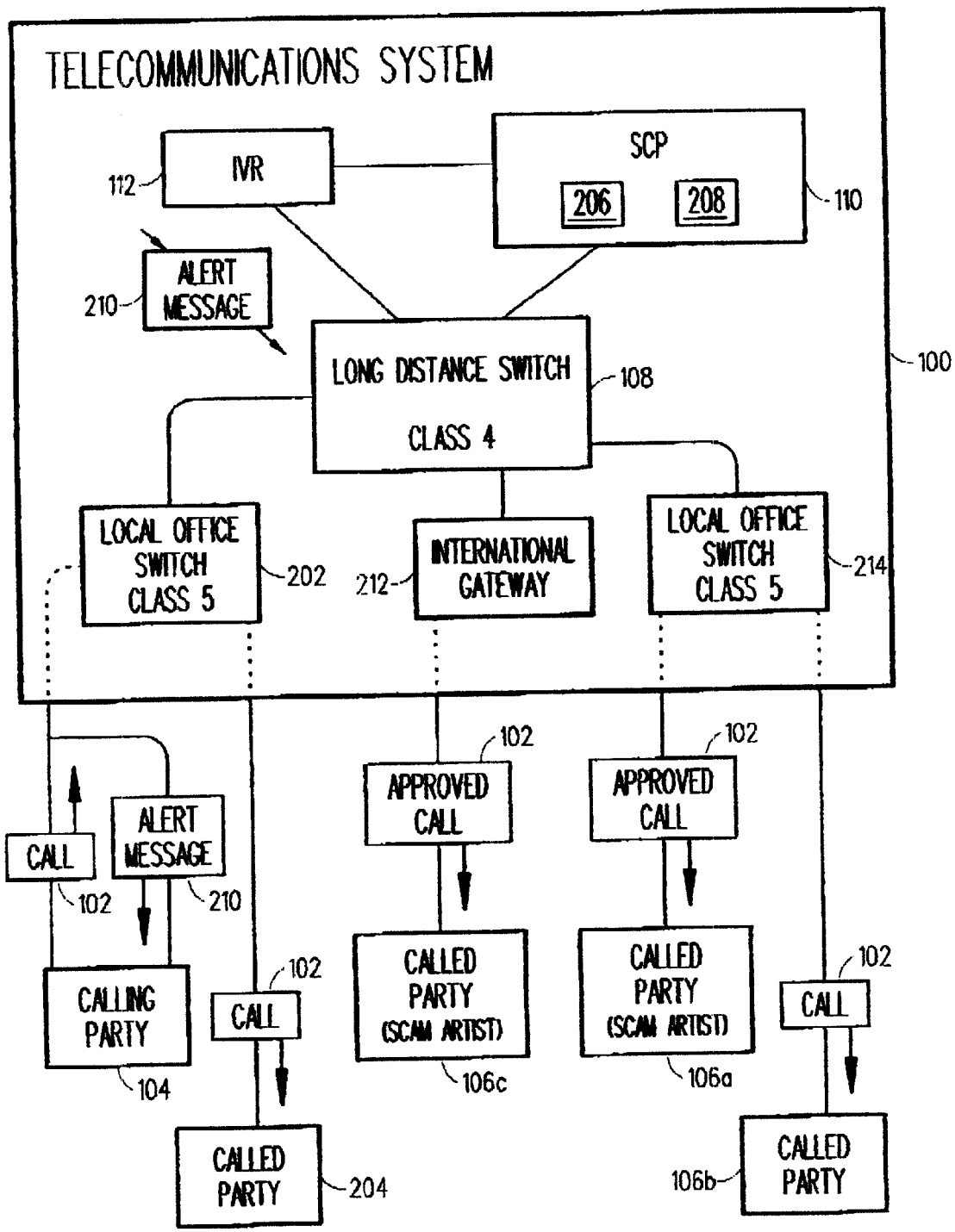
FIG. 2 is a block diagram illustrating in greater detail the components of the telecommunications system shown in FIG. 1.

Referring to FIG. 2, there is a block diagram illustrating in greater detail the components of the telecommunications system 100. Certain details associated with the telecommunications system 100 are known in the industry and as such need not be described herein. Therefore, for clarity, the description provided below in relation to the telecommunications system 100 omits some components not necessary to understand the present invention.

The calling party 104 using a wireless phone or land-based phone originates the telephone call 102 towards a local office switch 202 that is managed by a local service provider such as Southwestern Bell. The local office switch 202 typically connects the calling party 104 to a called party 204 if the telephone call 102 has an area code within the coverage area of the local service provider. This type of telephone call 102 is commonly known as a local telephone call or a short-distance toll call.

If the local service provider does not service the area in which the telephone call 102 is directed, then the local office switch 202 forwards the telephone call 102 to a long distance switch 108 (described herein as the switch 108) that is managed by a long distance service provider such as AT&T. The switch 108 can be programmed to forward information about the telephone call 102 to a SCP 110 (e.g., Service Control Point (SCP)) when the telephone call 102 has a predefined characteristic that can be or is associated with telephone toll fraud schemes. For instance, the switch 108 can query the SCP 110 when the telephone call 102 is an 800/888 call or has a three-digit area code that directs the telephone call 102 to a foreign country. Alternatively, the switch 108 can be programmed to query the SCP 110 whenever a translation of the digits of the telephone call 102 is required to determine a destination of the telephone call 102.

The SCP 110 includes a database 206 and controller 208 capable of interacting with one another to determine whether or not the telephone call 102 has a fraudulent attribute. To determine whether or not the telephone call 102 has a fraudulent attribute, the SCP 110 can translate the digits of the telephone call 102 to discover (or attempt to discover) a particular destination of the called party 106a, 106b or 106c. The SCP 110 may indicate that the telephone call 102 has a fraudulent attribute if the calling party 104 can be billed or is going to be billed at a different billing rate than previously agreed upon with the long distance service provider.

There are several circumstances where the SCP 110 would indicate that the telephone call 102 has a fraudulent attribute. First, the telephone call 102 has a fraudulent attribute if the telephone call 102 appears to be a free call (e.g., 800/888 call) or domestic long distance call and the particular destination of the called party 106c is determined to be in a foreign country. Secondly, the telephone call 102 has a fraudulent attribute if the telephone call 102 appears to be a free call (e.g., 800/888 call) or domestic long distance call and the particular destination of the called party 106a is determined to be a pay-per-call number (e.g., 900 number). Thirdly, the SCP 110 would indicate that the telephone call 102 has a fraudulent attribute if the SCP 110 was not able to determine the particular destination of a called party. In other words, the SCP 110 is programmed to indicate that the telephone call 102 has a fraudulent attribute if the long distance service provider can not assure the calling party 104 that the telephone call 102 is free or if they are going to be billed at a previously agreed upon billing rate.

In the event the SCP 110 determines that the telephone call 102 has a fraudulent attribute, then an IVR 112 forwards an alert message 210 towards the calling party 104. The alert message 210 informs the calling party 104 that there is a possibility of telephone toll fraud occurring if the telephone call 102 is connected to the called party 106a or 106c. In addition, the IVR 112 may inform the calling party 104 about the destination of the called party 106a or 106c. Moreover, the IVR 112 could inform the calling party 104 as to how much the telephone call 102 may really cost if connected to the called party 106a or 106c.

Thereafter, the calling party 104 can indicate if they want the telephone call 102 to be connected to the called party 106a or 106c even though the telephone call 102 has a fraudulent attribute. If the calling party 104 indicates that they still want the telephone call 102 to be connected, then the SCP 110 can enable the connection of the telephone call 102 to the called party 106a or 106c through the appropriate switch (e.g., International gateway 212, local office switch 214). Of course, the long distance service provider may not be responsible for any telephone charges that the calling party 104 may be billed once they approved the connection to the called party 106a or 106c. And, if the calling party 104 indicates that they do not want the telephone call 102 to be connected, then the SCP 110 can drop the telephone call 102 before the call set-up procedure is complete and protect the calling party 104 from potential telephone toll fraud.

Lastly, in the event the SCP 110 determines that the telephone call 102 does not have a fraudulent attribute, then the SCP 110 can inform the switch 108 as to the best route to connect the calling party 104 to the called party 106a. The switch 108 can then automatically connect the calling party 104 to the called party 106b.

It should be understood that the switch 108 can perform the same type of translations as the SCP 110 to determine if the telephone call 102 has a fraudulent attribute. But, the switch 108 typically does not perform complicated translations as would be required by the pre-screening service of the present invention. Because, the long distance service provider can more easily and efficiently program the relatively small number of SCPs 110 rather than program the relatively large number of switches 108 in their network..

It should also be understood that the local service provider could also offer the pre-screening service of the present invention to the calling party 104 and could also program their own SCP (not shown) to perform the necessary translations of the telephone call 102.

Figure 3:
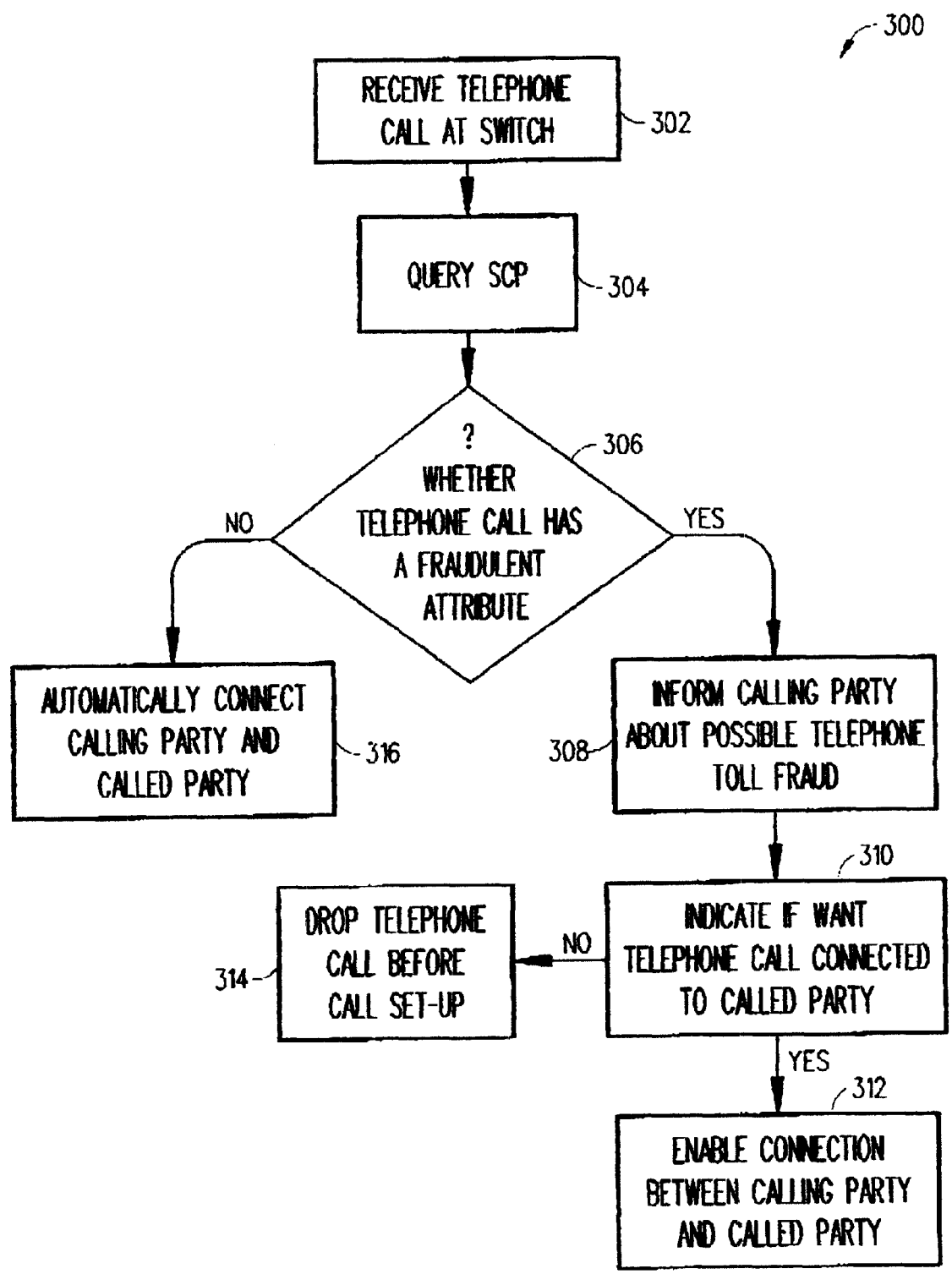
FIG. 3 is a flowchart illustrating the steps of a preferred method in accordance with the present invention.

Referring to FIG. 3, there is a flowchart illustrating the steps of the preferred method 300 that can pre-screen a telephone call to help prevent telephone toll fraud. Beginning at step 302, the switch 108 receives the telephone call 102 that was originated by the calling party 104. Again, the long distance service provider manages and controls the switch 108 (class 4 switch) which receives the telephone call 102 from the local office switch 202 (class 5 switch).

At step 304, the switch 108 queries the SCP 110 when the telephone call 102 has a predefined characteristic that can be or is associated with telephone toll fraud schemes. For instance, the switch 108 can query the SCP 110 when the telephone call 102 is an 800/888 call or has a three-digit area code that directs the telephone call 102 to a foreign country. Alternatively, the switch 108 can be programmed to query the SCP 110 whenever a translation of the digits of the telephone call 102 is required to determine a destination of the telephone call 102. If the switch 108 does not forward information about the telephone call 102 to the SCP 110, then the switch 108 automatically connects the telephone call 102 to a called party 106b.

At step 306, the SCP 110 reviews the digits of the telephone call 102 to determine whether or not the telephone call 102 has a fraudulent attribute. As described below with respect to FIG. 4, there are several circumstances in which the SCP 110 would likely indicate that the telephone call 102 has a fraudulent attribute.

Figure 4:
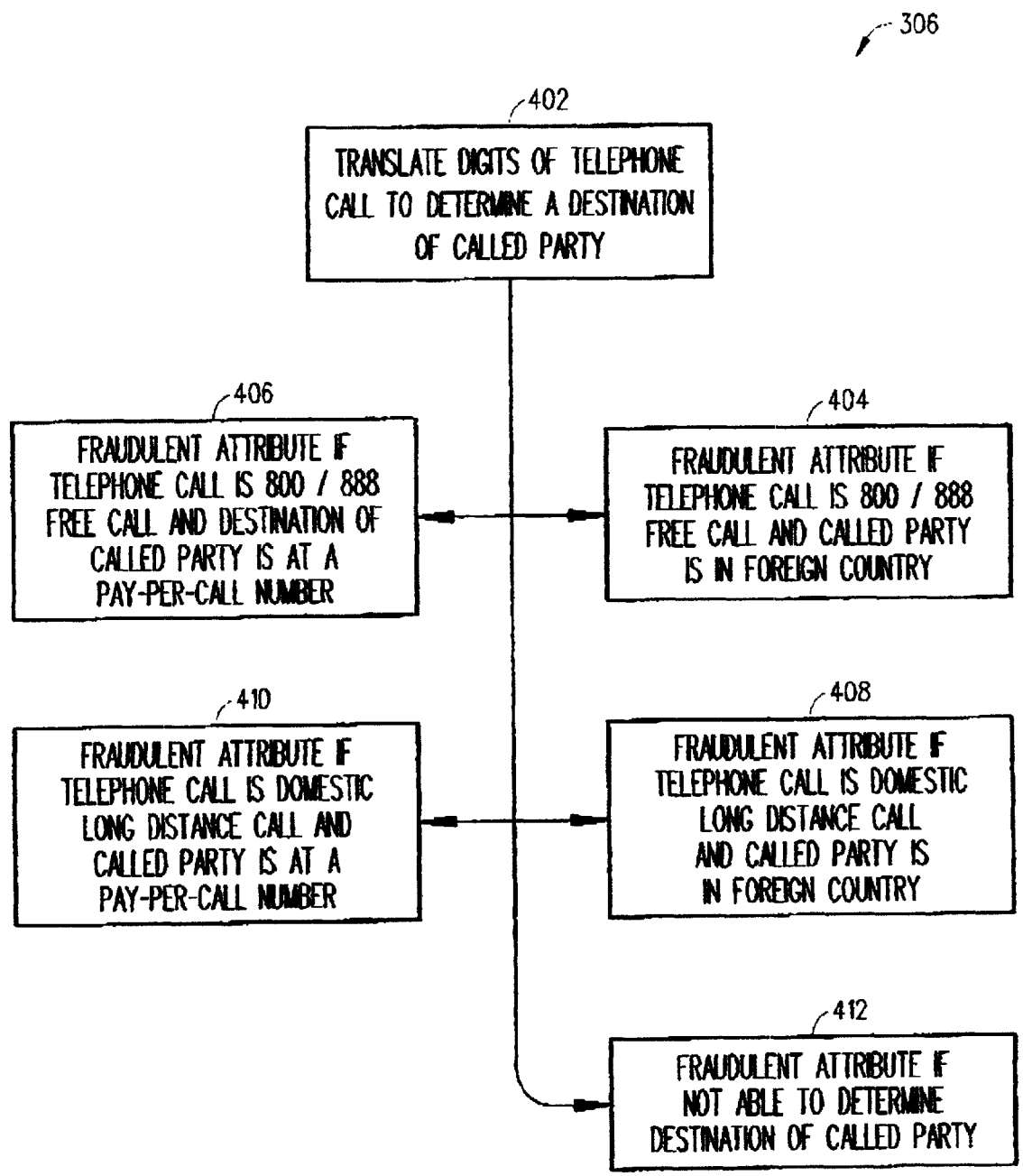
FIG. 4 is a flowchart illustrating in greater detail the determining step 306 of the preferred method shown in FIG. 3.

Referring to FIG. 4, there is a flowchart illustrating in greater detail step 306 of the method 300 where it is determined whether or not the telephone call 102 has a fraudulent attribute. At step 402, the SCP 110 translates the digits of the telephone call 102 to discover (or attempt to discover) a particular destination of the called party 106a, 106b. or 106c. The SCP 110 indicates whether or not the telephone call 102 has a fraudulent attribute based on the determined destination of the telephone call 102. Basically, if the calling party 104 is going to be billed or has the potential of being billed at a different billing rate than previously agreed upon with the long distance service provider, then the SCP 110 would indicate that the telephone call 102 has a fraudulent attribute.

At step 404, the SCP 110 would indicate that the telephone call 102 has a fraudulent attribute if the telephone call 102 is an 800/888 free call and the particular destination of the called party 106b is determined to be in a foreign country. In other words, the 800/888 free call is really an international call that has an international billing rate.

At step 406, the SCP 110 would indicate that the telephone call 102 has a fraudulent attribute if the telephone call 102 is an 800/888 free call and the particular destination of the called party 106a is determined to be a pay-per-call number (e.g., 900 number).

At step 408, the SCP 110 would indicate that the telephone call 102 has a fraudulent attribute if the telephone call 102 appears to be a domestic long distance call but the particular destination of the called party 106b is in a foreign country. In other words, the domestic long distance call is really an international call that has an international billing rate.

At step 410, the SCP 110 would indicate that the telephone call 102 has a fraudulent attribute if the telephone call 102 is a domestic long distance call and the particular destination of the called party 106a is determined to be a pay-per-call number (e.g., 900 number).

At step 412, the SCP 110 would indicate that the telephone call 102 has a fraudulent attribute if the SCP 110 was not able to determine the particular destination of the called party. In other words, the SCP 110 is programmed to indicate that the telephone call 102 has a fraudulent attribute if the long distance service provider can not assure the calling party 104 that the telephone call 102 is free to the calling party 104. The SCP 110 is also programmed to indicate that the telephone call 102 has a fraudulent attribute if the service provider can not assure the calling party 104 that they are going to be billed at a previously agreed upon billing rate.

Referring again to FIG. 3 and the pre-screening method 300, if the SCP 110 determines in step 306 that the telephone call 102 has a fraudulent attribute, then at step 308 the IVR 112 informs the calling party 104 that there is a possibility of telephone toll fraud occurring if the telephone call 102 is connected to the called party 106a or 106c. In addition, the IVR 112 may inform the calling party 104 about the destination of the called party 106a or 106c. Moreover, the IVR 112 could inform the calling party 104 as to how much the telephone call 102 may really cost if connected to the called party 106a or 106c.

At step 310, the calling party 104 can use a voice command or press a predetermined key to indicate if they want to the telephone call 102 to be connected to the called party 106a or 106c even though the telephone call 102 has a fraudulent attribute.

If the calling party 104 indicates that they still want the telephone call 102 to be connected at step 310, then at step 312 the SCP 110 can enable the connection of the telephone call 102 to the called party 106a or 106c. Of course, the long distance service provider may not be responsible for any telephone charges that the calling party 104 may be billed once they approved the connection to the called party 106a or 106c.

If the calling party 104 indicates that they do not want the telephone call 102 to be connected at step 310, then at step 314 the SCP 110 can drop the telephone call 102 and protect the calling party 104 from potential telephone toll fraud.

In the event the SCP 110 determines at step 306 that the telephone call 102 does not have a fraudulent attribute, then the SCP 110 can inform the switch 108 as to the best route to connect the calling party 104 to the called party 106b. The switch 108 can then at step 316 automatically connect the calling party 104 to the called party 106b.

Even though the present invention is described from the viewpoint of a calling party that is located in the United States, it should be understood that the present invention could also operate when the calling party is located in another country such as France.

From the foregoing, it can be readily appreciated by those skilled in the art that the present invention provides a telecommunications system, SCP and method capable of pre-screening a telephone call to help prevent telephone toll fraud. As disclosed, the present invention basically operates to alert a calling party that there is a possibility that they may be billed at an unknown rate for a phone call which the calling party likely believes is a free call or is a normal domestic long distance call.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for pre-screening a call to help prevent telephone toll fraud, said method comprising the steps of:

receiving the call originated by a calling party;

determining whether the call has a fraudulent attribute prior to connecting the calling party to a called party; and wherein if the call has a fraudulent attribute then the method further includes the step of informing the calling party that there is a possibility of telephone toll fraud occurring if the call is connected to the called party.

2. A method for pre-screening a call to help prevent telephone toll fraud, said method comprising the steps of:

receiving the call originated by a calling party;

determining whether the call has a fraudulent attribute prior to connecting the calling party to a called party;

wherein if the call has a fraudulent attribute then the method further includes the step of informing the calling party that there is a possibility of telephone toll fraud occurring if the call is connected to the called party; and receiving an indication from the calling party as to whether or not the call should be connected to the called party even though the call has a fraudulent attribute.

3. A method for pre-screening a call to help prevent telephone toll fraud, said method comprising the steps of:

receiving the call originated by a calling party;

determining whether the call has a fraudulent attribute prior to connecting the calling party to a called party;

wherein said step of determining whether the call has a fraudulent attribute further includes the step of translating digits of the call to determine a particular destination of the called party; and wherein there is a fraudulent attribute if the call appears to be a domestic long distance call and the particular destination of the called party is a pay-per-call number.

4. A telecommunications system capable of pre-screening a call to help prevent telephone toll fraud, said telecommunications system comprising:

a switch capable of receiving the call originated by a calling party;

a service control point capable of receiving a query about the call from said switch, and further capable of determining whether the call has a fraudulent attribute prior to connecting the calling party to a called party; and an interactive voice response system capable of informing the calling party that there is a possibility of telephone toll fraud occurring if the call is connected to the called party, whenever said service control point determines that the call has a fraudulent attribute.

5. A telecommunications system capable of pre-screening a call to help prevent telephone toll fraud, said telecommunications system comprising:

a switch capable of receiving the call originated by a calling party;

a service control point capable of receiving a query about the call from said switch, and further capable of determining whether the call has a fraudulent attribute prior to connecting the calling party to a called party;

an interactive voice response system capable of informing the calling party that there is a possibility of telephone toll fraud occurring if the call is connected to the called party, whenever said service control point determines that the call has a fraudulent attribute; and wherein said interactive voice response system is further capable of receiving an indication from the calling party as to whether or not the call should be connected to the called party even though the call has a fraudulent attribute.

6. A service control point capable of pre-screening a call to help prevent telephone toll fraud, said service control point comprising:

a database;

a controller capable of receiving information about the call originated by a calling party, and further capable of interacting with the database to determine whether the call has a fraudulent attribute prior to enabling a connection between the calling party and a called party;

wherein said controller is capable of determining whether the call has a fraudulent attribute by translating digits of the call to determine a particular destination of the called party; and wherein there is a fraudulent attribute if the call appears to be a domestic long distance call and the particular destination of the called party is a 900 number.

* * * * *